US010422594B2

(12) United States Patent
Hewes et al.

(10) Patent No.: US 10,422,594 B2
(45) Date of Patent: Sep. 24, 2019

(54) CNC BROACHING TOOL AND METHOD FOR FORMING A MAGAZINE WELL IN A FIREARM

(71) Applicants: David A. Hewes, Chesterfield, MA (US); Craig Huppe, Woodstock, VT (US)

(72) Inventors: David A. Hewes, Chesterfield, MA (US); Craig Huppe, Woodstock, VT (US)

(*) Notice: Subject to any disclaimer, the term of this patent is extended or adjusted under 35 U.S.C. 154(b) by 48 days.

(21) Appl. No.: 15/881,699

(22) Filed: Jan. 26, 2018

(65) Prior Publication Data

US 2018/0216903 A1 Aug. 2, 2018

Related U.S. Application Data

(60) Provisional application No. 62/451,220, filed on Jan. 27, 2017.

(51) Int. Cl.
| | |
|---|---|
| *B23D 43/02* | (2006.01) |
| *F41A 3/66* | (2006.01) |
| *G05B 19/4099* | (2006.01) |
| *F41A 17/38* | (2006.01) |
| *B23D 13/00* | (2006.01) |

(52) U.S. Cl.
CPC .............. *F41A 3/66* (2013.01); *B23D 13/00* (2013.01); *B23D 43/02* (2013.01); *F41A 17/38* (2013.01); *G05B 19/4099* (2013.01)

(58) Field of Classification Search
CPC ........ B23D 43/02; B23D 13/00; B23D 37/10; B23D 37/08; B23D 37/22; B23D 43/00; B23D 11/00; F14A 3/66; F14A 17/38; B23C 7/04
See application file for complete search history.

(56) References Cited

U.S. PATENT DOCUMENTS

| | | | | |
|---|---|---|---|---|
| 2,474,877 A | * | 7/1949 | Wilson | B23D 11/00 409/334 |
| 4,593,488 A | * | 6/1986 | Ruger | F41A 3/66 42/75.03 |
| 2015/0125227 A1 | * | 5/2015 | Muller | B23B 31/02 408/1 R |
| 2016/0258697 A1 | * | 9/2016 | Hoon | F41A 17/38 |

FOREIGN PATENT DOCUMENTS

| | | | | |
|---|---|---|---|---|
| DE | 102007057157 A1 | * | 5/2009 | ............. B23B 29/04 |
| FR | 2354842 A1 | * | 1/1978 | ............... B23D 7/10 |
| WO | WO-2009068130 A1 | * | 6/2009 | ......... B23B 27/1614 |

* cited by examiner

*Primary Examiner* — Alan Snyder
(74) *Attorney, Agent, or Firm* — Parsons & Goltry; Robert Parsons; Michael Goltry

(57) ABSTRACT

A CNC milling machine and broaching tool for forming a magazine well in a firearm lower receiver, the magazine well having a forward end and a rearward end with a plurality of corners in the forward end and a plurality of corners in the rearward end. The CNC milling machine and broaching tool including a CNC milling machine for shaping a blank into a lower receiver having a guide hole with a length and a width and a broaching tool having a length less than the length of the guide hole and a width less than the width of the guide hole. The broaching tool having a single cutting edge for each of the plurality of corners in the forward end and the plurality of corners in the rearward end.

15 Claims, 4 Drawing Sheets

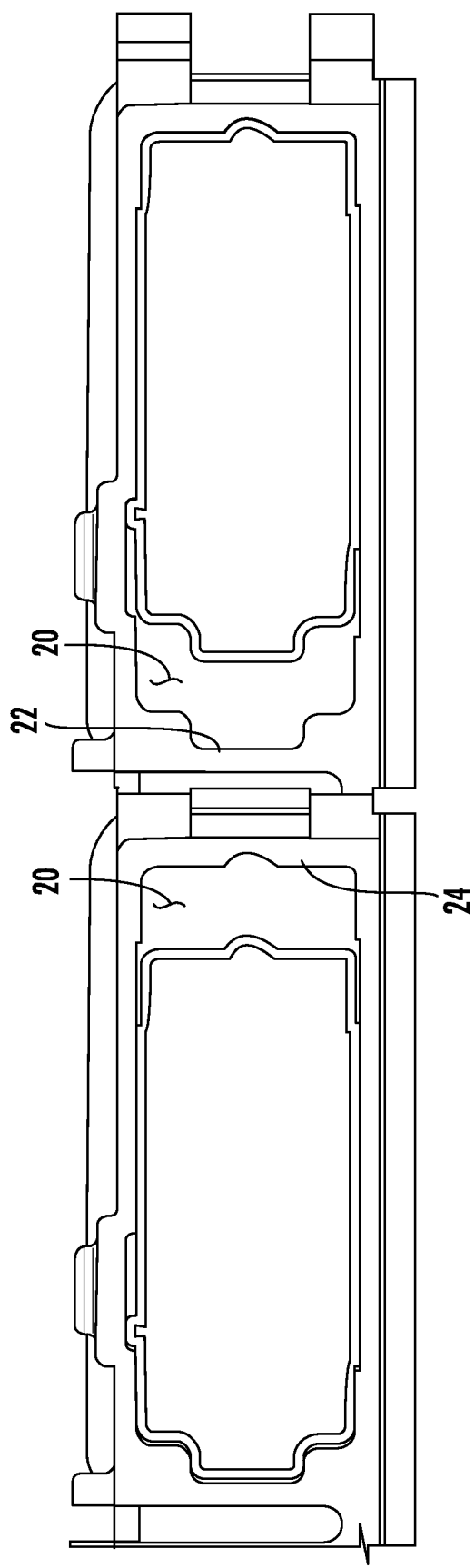

US 10,422,594 B2

CNC BROACHING TOOL AND METHOD FOR FORMING A MAGAZINE WELL IN A FIREARM

FIELD OF THE INVENTION

This invention relates to metal working.

More particularly, the present invention relates to forming a magazine well in a firearm.

BACKGROUND OF THE INVENTION

In the field of firearm manufacturing, the fabrication of a lower receiver is central to the process. Typically, the lower receiver is the foundation upon which the firearm is constructed. In conventional firearms, such as an AR-15/M16 style, a lower receiver includes, among other elements, a magazine well. During the conventional fabrication process, a magazine well is formed in the lower receiver by using a broaching machine. Broaching is a machining method in which a broach is used on a broaching machine. A broach is effectively a collection of single-point cutting tools arrayed in sequence, cutting one after the other. The series of cutting teeth each remove a portion of material as the cutting tool (broach) moves past or through the work piece. In the conventional fabrication of a lower receiver, a computer numerical control (CNC) milling machine is first employed to shape the lower receiver from a blank of material, and then the broaching machine is employed to form the magazine well. While effective, broaching machines and the tools for them are very expensive and very specialized. Additionally, the use of multiple machines requires additional time spent in set-up of the work piece in the different machines and transference of the work piece between the machines.

It would be highly advantageous, therefore, to remedy the foregoing and other deficiencies inherent in the prior art.

An object of the present invention is to provide a method and device for forming a magazine well in a lower receiver of a firearm during fabrication.

SUMMARY OF THE INVENTION

Briefly, to achieve the desired objects and advantages of the instant invention provided is a CNC milling machine and broaching tool for forming a magazine well in a firearm lower receiver. The magazine well includes a forward end and a rearward end with a plurality of corners in the forward end and a plurality of corners in the rearward end. The CNC milling machine and broaching tool include a CNC milling machine for shaping a blank into a lower receiver having a guide hole with a length and a width. A broaching tool includes a length less than the length of the guide hole and a width less than the width of the guide hole, and has a single cutting edge for each of the plurality of corners in the forward end and the plurality of corners in the rearward end. A coupling member couples the broaching tool to the CNC milling machine.

The broaching tool can further include a base element having a lower end, an upper end, a rearward end and a forward end. The single cutting edge for each of the plurality of corners is defined by a peripheral cutting edge extending from the lower end of the base element. The peripheral cutting edge includes a first portion at the rearward end, which includes the single cutting edge for each of the plurality of corners at the rearward end of the magazine well. The peripheral cutting edge also includes second portion at the forward end, which includes the single cutting edge for each of the plurality of corners at the forward end of the magazine well. The first portion of the peripheral cutting edge has a first curve profile matching a curve profile of the rearward end of the magazine well, and the second portion of the peripheral cutting edge has a second curve profile matching a curve profile of the forward end of the magazine well.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which:

FIG. 6 is a top view of the lower receiver with a fully formed magazine well formed by the CNC machine showing the broach tool in a fully rearward position; and FIG. 7 is a top view of the lower receiver with a fully formed magazine well formed by the CNC machine showing the broach tool in a fully forward position.

DETAILED DESCRIPTION OF A PREFERRED EMBODIMENT

Figure 1:
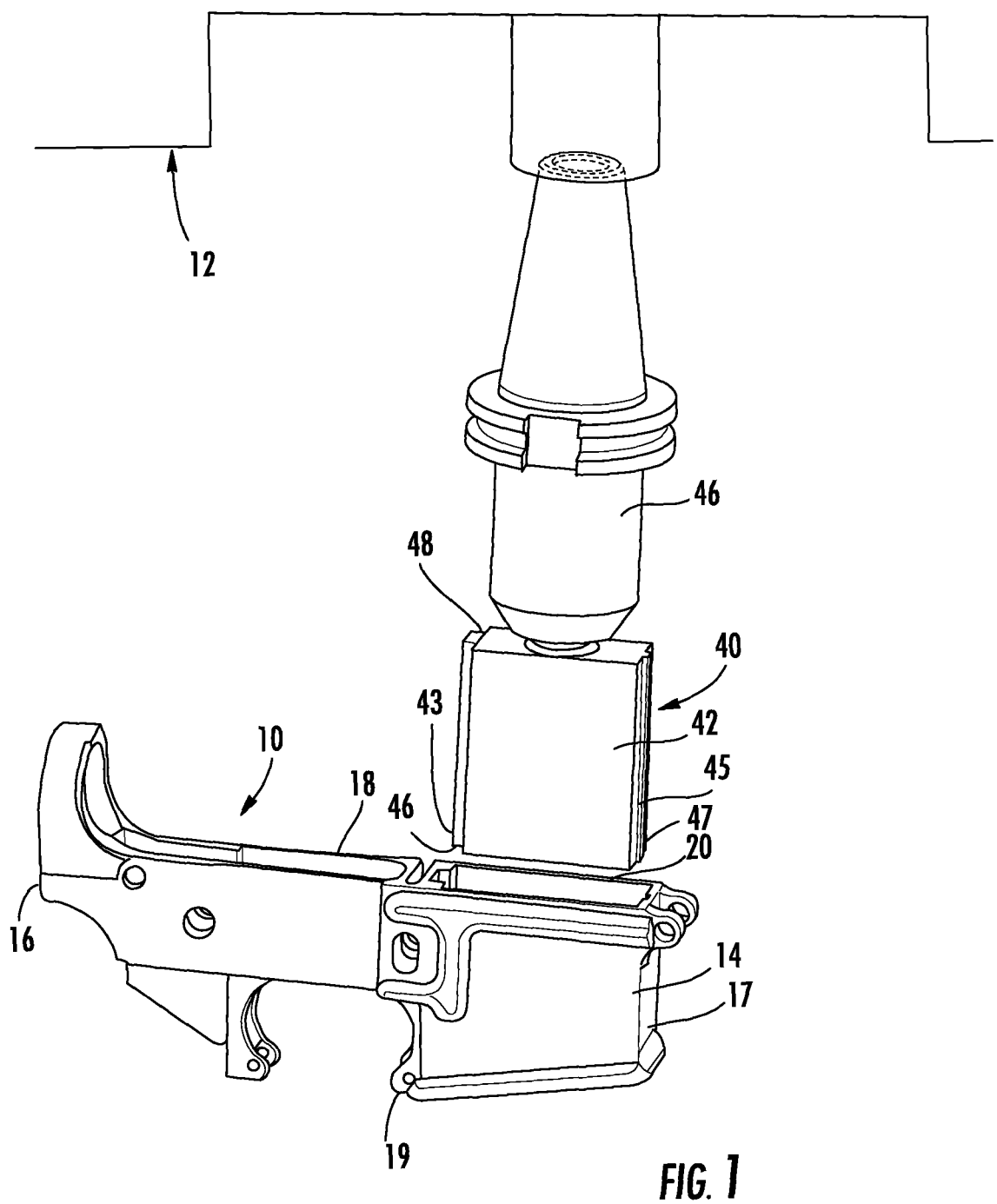
FIG. 1 is a perspective side view of a lower receiver and a CNC machine carrying a broach tool according to the present invention.

Turning now to the drawings in which like reference characters indicate corresponding elements throughout the several views, attention is directed to FIG. 1 which illustrates a lower receiver 10 for an AR15/M16 style firearm and a computer numerical control (CNC) milling machine 12. Lower receiver 10 includes many features, but specifically includes a magazine well 14. CNC machine 12 is employed in a conventional manner to shape the lower receiver from a blank of material. Since CNC machine 12 is employed to shape lower receiver 10 from a blank, a novel approach is to form magazine well 14 using CNC machine 12 as well. In this manner, the workpiece does not need to be moved and reset, but can be finished in a single machine simply by changing tools. For this to occur, a new type of broaching tool for a CNC milling machine is required.

Lower receiver 10 includes a rearward end 16, toward the buttstock of a firearm, a forward end 17, toward the muzzle of a firearm, a top 18 and a bottom 19. Magazine well 14 is formed proximate forward end 17 and extends toward rearward end 16 from top 18 to bottom 19. With additional reference to FIG. 2, when looking from top 18 down through magazine well 14, magazine well 14 includes a void 20 defined by a rear surface 22, a front surface 24, and opposing side surfaces 25 and 26 extending therebetween. Void 20 of magazine well 14 is shaped to receive a magazine (not shown), and in this specific embodiment, includes nine corners, indicated by arrowed lines A, at a rearward end 27 thereof, and five corners, indicated by arrowed lines B, at a forward end 28 thereof as viewed from above. Thus, void 20 is defined by a curve profile, as viewed from above and extending through lower receiver from top to bottom, for rearward end 27 and forward end 28. Rearward end 27 includes a curve profile having nine corners and forward end 28 includes a curve profile having five corners. While a specific curve profile is illustrated for a AR15/M16 style firearm, other firearms employing magazine wells will have different curve profiles, which can be provided for by the present invention.

Figure 2:
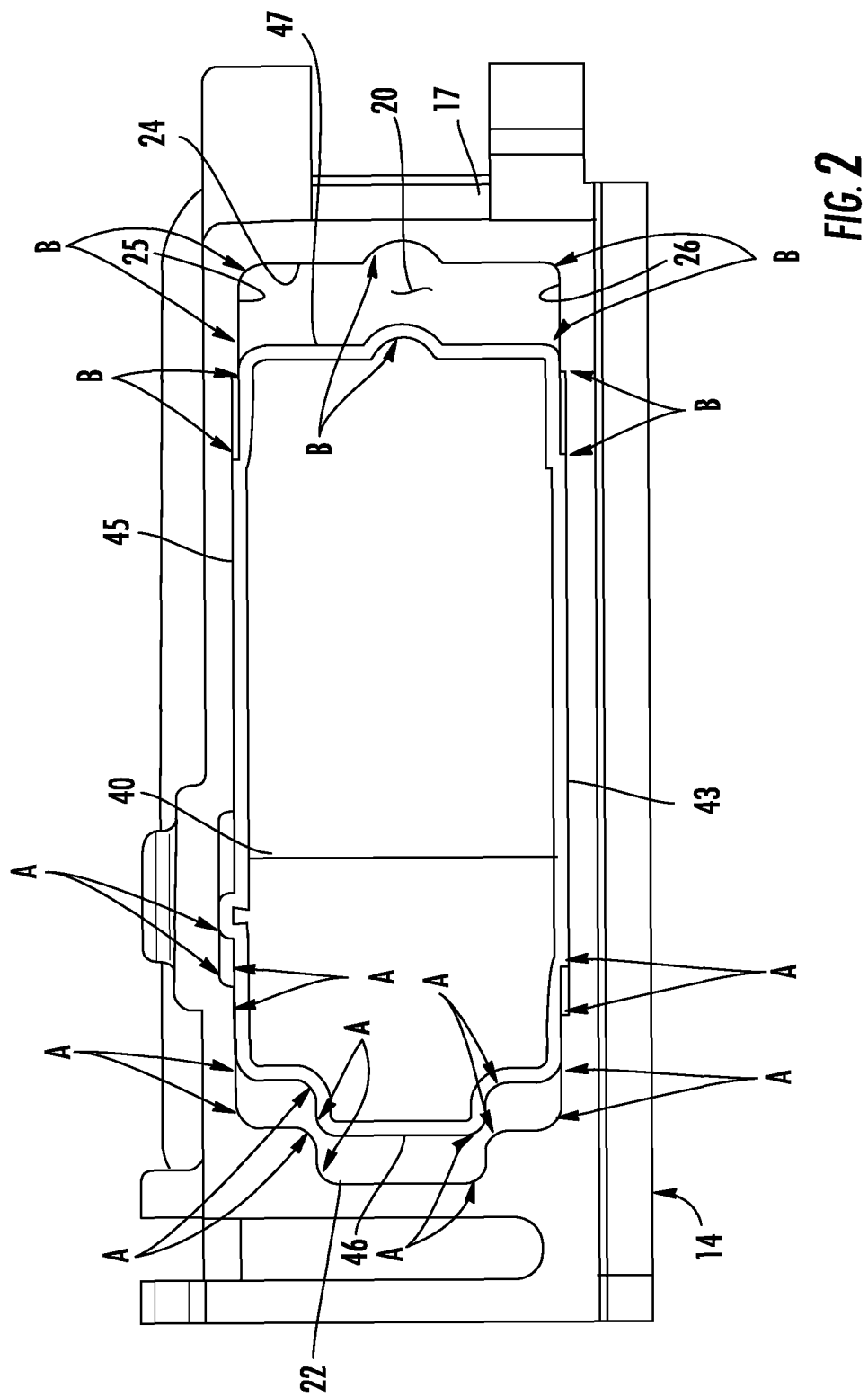
FIG. 2 is a top plan view of the magazine well of a lower receiver with broach tool of the present invention.

Still referring to FIG. 1, with additional reference to FIG. 2, a broaching tool, generally designated 40, is illustrated. Broaching tool 40 includes a base element 42 having a single cutting edge 43 formed around the periphery thereof at a lower surface 45, and a coupling member 44 carried by base element 42 at an upper surface 48 thereof. Unlike conventional broaches which have a plurality of cutting edges in sequence for each surface cut, a single cutting edge is provided for each surface cut in broach tool 40. Base element 42 of broach tool 40 includes a rearward end 46 and a forward end 47. Rearward end 46 includes a portion 54 of cutting edge 43 having nine corners indicated by the arrowed lines A associated with the nine corners of rearward end 27 of void 20, and forward end 47 includes a portion 56 of cutting edge 43 having five corners indicated by the arrowed lines B associated with the five corners of forward end 28 of void 20. As can be seen, portion 54 is shaped to match the curve profile of rear end 27 and portion 56 is shaped to match the curve profile of forward end 28. Broach tool 40 is employed by passing it through lower receiver 10 at magazine well 14, removing material therefrom. This occurs multiple times with the CNC machine repositioning broach tool 40 at each pass to remove a portion of the blank until the finished shape is obtained.

Figure 3:
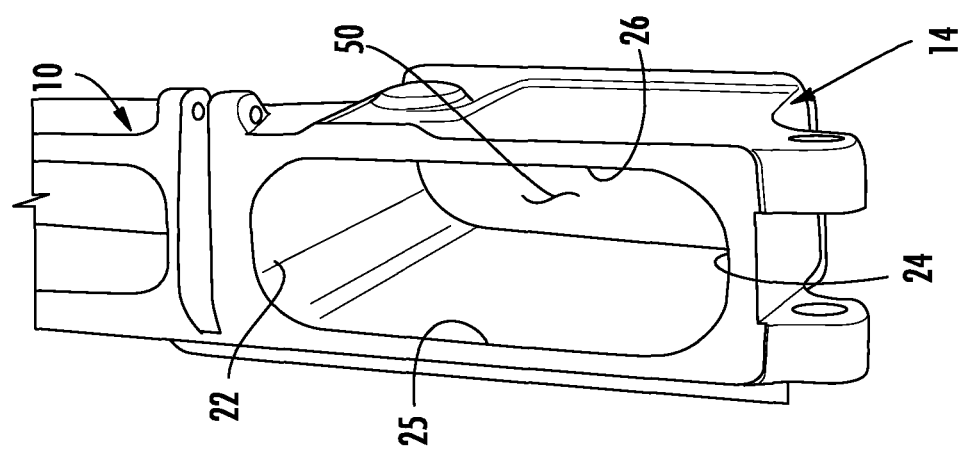
FIG. 3 is a top view of the lower receiver with a guide hole for the magazine well formed by the CNC machine.

Turning now to FIG. 3, in operation, lower receiver 10 is produced by the CNC machine from a blank in a conventional manner. The lower receiver is shaped, including the formation of a guide hole 50 having a width (distance between opposing surfaces 25 and 26) slightly less than the width of broach tool 40. The length (distance between front surface 24 and rear surface 22) of guide hole 50 is greater than the length of broach tool 40. The first pass of broach tool 40 begins with cutting edge 43 removing portions of lower receiver 10 defining guide hole 50 to form the corners in opposing surfaces 25 and 26. Broach tool 40 is then retracted, repositioned by CNC machine 12 toward either rear end 27 or front end 28 and passed through guide hole 50 again. This process is repeated with broach tool 40 incrementally repositioned toward either rear end 27 or front end 28, eventually incrementally positioning broach tool 40 rearwardly and forwardly to remove portions of the blank within guide hole 50 until curve profiles for rearward end 27 and forward end 28 are achieved.

Figure 5:
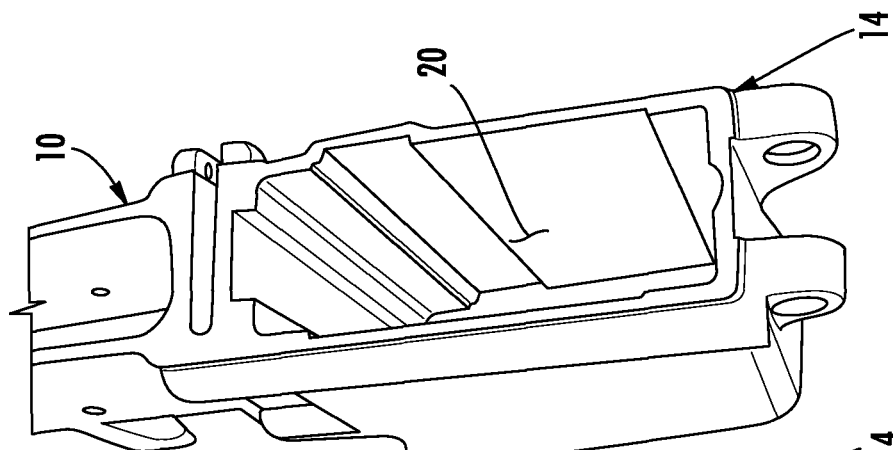
FIG. 5 is a top view of the lower receiver with a fully formed magazine well formed by the CNC machine using the broach tool of the present invention.
Figure 4:
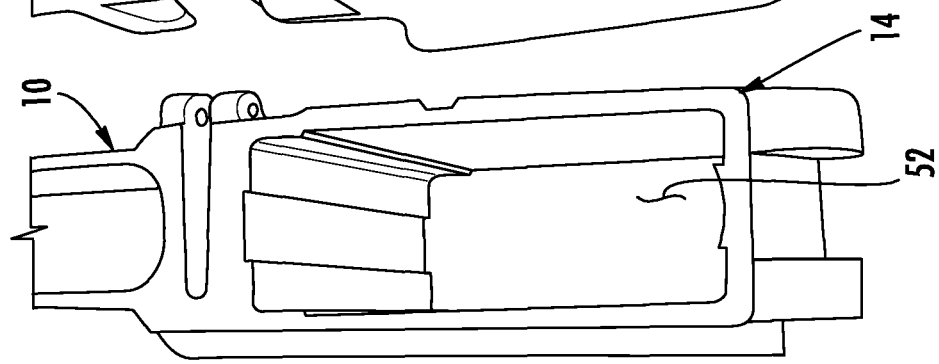
FIG. 4 is a top view of the lower receiver with a partially formed magazine well formed by the CNC machine using the broach tool of the present invention.

Referring now to FIG. 4, material has been removed by this process until an intermediate hole 52 is formed from removing material from guide hole 50. Turning to FIG. 5, a finished void 20 for magazine well 14 is illustrated. As can be noted, forward end 28 and rearward end 27 have each been incrementally shaped to present the curve profile of portion 54 and portion 56, respectively.

Turning to FIGS. 6 and 7, with initial reference to FIG. 6, a top view of magazine well 14 is illustrated with broach tool 40 finished in its incremental movement rearward, with the void 20 of magazine well 14 fully formed. Turning to FIG. 7, a top view of magazine well 14 is illustrated with broach tool 40 finished in its incremental movement forward, with the void 20 of magazine well 14 fully formed.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A CNC milling machine and broaching tool for forming a magazine well in a firearm lower receiver, the magazine well having a forward end and a rearward end with a plurality of corners in the forward end and a plurality of corners in the rearward end, the CNC milling machine and broaching tool comprising:
   a CNC milling machine for shaping a blank into a lower receiver having a guide hole with a length and a width;
   a broaching tool having a length less than the length of the guide hole and a width less than the width of the guide hole, and having a single cutting edge for each of the plurality of corners in the forward end and the plurality of corners in the rearward end; and
   a coupling member coupling the broaching tool to the CNC milling machine.

2. A CNC milling machine and broaching tool as claimed in claim 1, wherein the broaching tool further includes a base element having a lower end, an upper end, a rearward end and a forward end, the single cutting edge for each of the plurality of corners defined by a peripheral cutting edge extending from the lower end of the base element.

3. A CNC milling machine and broaching tool as claimed in claim 2, wherein the peripheral cutting edge includes a first portion at the rearward end including the single cutting edge for each of the plurality of corners at the rearward end of the magazine well, and a second portion at the forward end including the single cutting edge for each of the plurality of corners at the forward end of the magazine well.

4. A CNC milling machine and broaching tool as claimed in claim 3 wherein the first portion of the peripheral cutting edge has a first curve profile matching a curve profile of the rearward end of the magazine well, and the second portion of the peripheral cutting edge has a second curve profile matching a curve profile of the forward end of the magazine well.

5. A CNC milling machine and broaching tool as claimed in claim 3 wherein the first portion includes nine cutting edge portions.

6. A CNC milling machine and broaching tool as claimed in claim 3 wherein the second portion includes five cutting edge portions.

7. A CNC milling machine and broaching tool for forming a magazine well in a firearm lower receiver, the magazine well having a forward end and a rearward end with a plurality of corners in the forward end and a plurality of corners in the rearward end, the CNC milling machine and broaching tool comprising:
   a CNC milling machine for shaping a blank into a lower receiver having a guide hole with a length and a width;
   a broaching tool comprising:
      a base element having a lower end, an upper end, a rearward end and a forward end;
      a peripheral cutting edge extending from the lower end; and
   a coupling member coupling the broaching tool to the CNC milling machine.

8. A CNC milling machine and broaching tool as claimed in claim 7, wherein the peripheral cutting edge includes a first portion at the rearward end including a single cutting edge for each of the plurality of corners at the rearward end of the magazine well, and a second portion at the forward end including a single cutting edge for each of the plurality of corners at the forward end of the magazine well.

9. A CNC milling machine and broaching tool as claimed in claim 8 wherein the first portion of the peripheral cutting edge has a first curve profile matching a curve profile of the rearward end of the magazine well, and the second portion of the peripheral cutting edge has a second curve profile matching a curve profile of the forward end of the magazine well.

10. A method of forming a magazine well in the lower receiver of a firearm, the magazine well having a forward end and a rearward end with a plurality of corners in the forward end and a plurality of corners in the rearward end, the method comprising the steps of:
providing a blank of material;
using a computer numerical control (CNC) milling machine to form the blank of material into a lower receiver with a guide hole therethrough, the guide hole having a length and a width;
providing a broaching tool having a length less than the length of the guide hole and a width less than the width of the guide hole, and having a single cutting edge, one each, for each of the plurality of corners in the forward end and the plurality of corners in the rearward end;
attaching the broaching tool to the computer numerical control (CNC) milling machine; and
using the computer numerical control (CNC) milling machine to make a pass through the guide hole with the broaching tool, removing material with at least some of the plurality of single cutting edges; and
using the CNC milling machine to incrementally move the broaching tool multiple times in a forward direction and a rearward direction, and making a pass through the guide hole with the broaching tool with each incremental movement, removing material with at least some of the plurality of single cutting edges with each pass.

11. A method as claimed in claim 10, wherein the step of providing a broaching tool further includes providing a base element having a lower end, an upper end, a rearward end and a forward end, the single cutting edge for each of the plurality of corners defined by a peripheral cutting edge extending from the lower end of the base element.

12. A method as claimed in claim 11, wherein the step of providing a peripheral cutting edge includes providing the peripheral cutting edge with a first portion at the rearward end including the single cutting edge for each of the plurality of corners at the rearward end of the magazine well, and a second portion at the forward end including the single cutting edge for each of the plurality of corners at the forward end of the magazine well.

13. A method as claimed in claim 12, wherein the first portion of the peripheral cutting edge has a first curve profile matching a curve profile of the rearward end of the magazine well, and the second portion of the peripheral cutting edge has a second curve profile matching a curve profile of the forward end of the magazine well.

14. A method as claimed in claim 12, wherein the first portion includes nine cutting edge portions.

15. A method as claimed in claim 12, wherein the second portion includes five cutting edge portions.

\* \* \* \* \*